Figure 1:
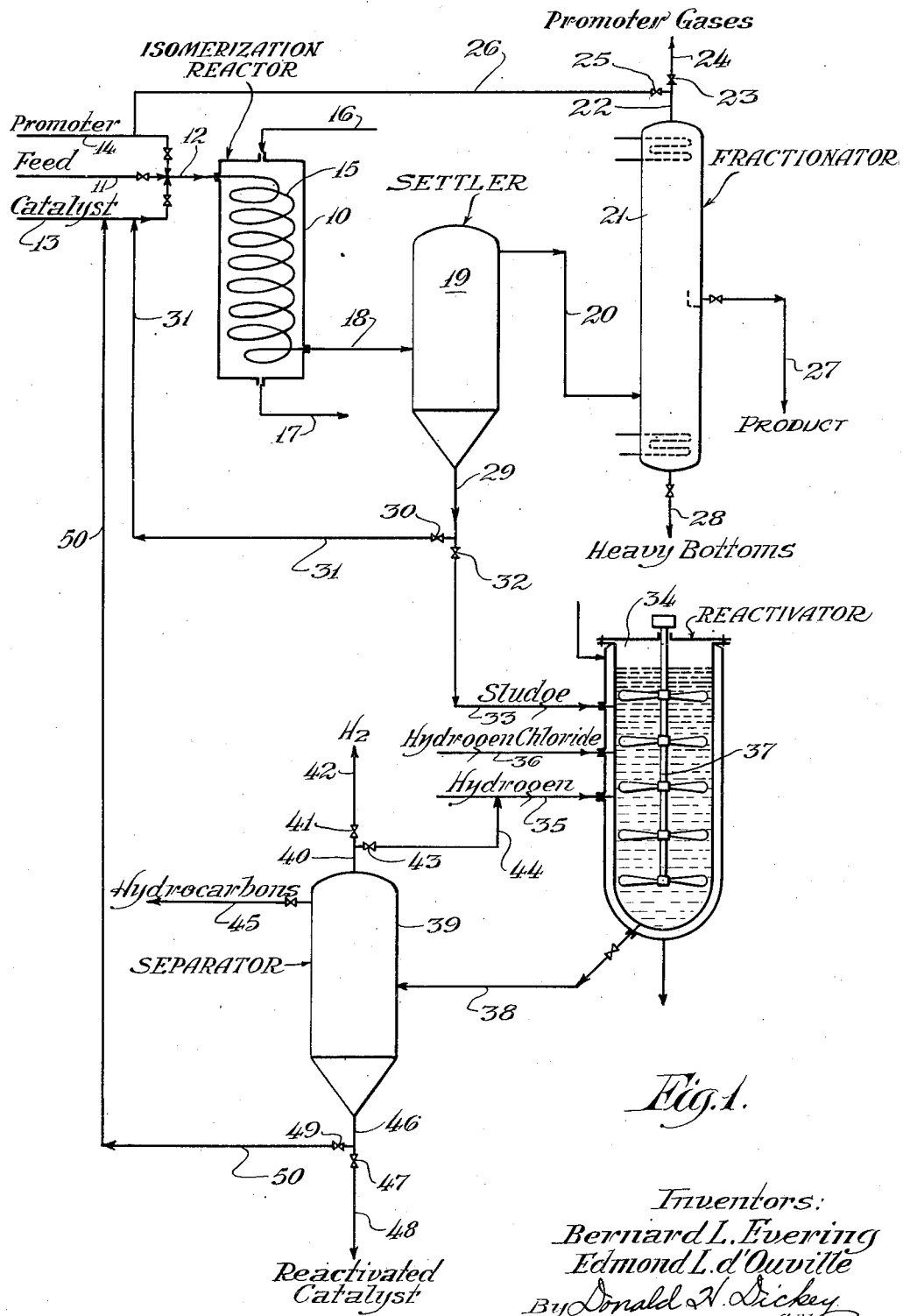

Inventors:
Bernard L. Evering
Edmond L. d'Ouville
By Donald H. Dickey
Attorney.

Patented Aug. 25, 1942

2,293,891

UNITED STATES PATENT OFFICE 2,293,891

CATALYST REACTIVATION

Bernard L. Evering and Edmond L. d'Ouville, Chicago, Ill., assignors to Standard Oil Company, Chicago, Ill., a corporation of Indiana Application August 19, 1940, Serial No. 353,210

8 Claims. (Cl. 196—78)

This invention relates to the recovery of aluminum halide catalysts and relates more particularly to the reactivation of aluminum halide catalysts degraded during the conversion of hydrocarbons.

The use of aluminum halide catalysts for the conversion of hydrocarbons, either alone or in the presence of such added promoters as hydrogen halides, organic halides, etc., is well known. For example, aluminum chloride is known to promote the cracking of hydrocarbons, particularly high molecular weight hydrocarbons such as may be found in kerosenes, gas oils, etc., to hydrocarbons of lower molecular weight; the polymerization of normally gaseous olefins to form higher molecular weight olefins of gasoline or lubricating oil boiling range; the alkylation of isoparaffinic or aromatic hydrocarbons with olefinic hydrocarbons throughout a wide boiling range; the isomerization of straight-chain hydrocarbons to branched-chain hydrocarbons; and numerous additional conversion processes wherein hydrocarbons or mixtures of hydrocarbons are converted to other hydrocarbons usually of more desirable characteristics commercially as regards configuration, boiling range, octane number, oxidation stability, etc. In practically all these processes, the aluminum halide, such as, for example, aluminum chloride or aluminum bromide, is gradually converted to an aluminum halide-hydrocarbon sludge. The exact mechanism of this conversion is not understood, but apparently the catalyst forms complex compounds with the hydrocarbons undergoing treatment and in so doing its catalytic activity is diminished or eliminated. The sludge varies from black, tarry or resinous matter to light red oils and, broadly speaking, the chemical structure defies analysis. Throughout this specification and claims, the term "aluminum halide-hydrocarbon sludge" is intended to designate the reaction product of an aluminum halide with a hydrocarbon or hydrocarbon mixture.

It is also well established that fresh aluminum chloride or fresh aluminum bromide is extremely active as a catalyst and that its use is often deleterious because of the extremes to which it carries the reaction and the undesirable side reactions which it introduces and which cannot be controlled. This is particularly true in the case of alkylation and certain isomerization reactions. It is often desirable, therefore, to modify the catalytic activity of the aluminum halide catalyst and it has been discovered that the light "red oil" complexes which are quite mobile and fluid have the catalytic activity of the aluminum halide sufficiently modified to be acceptable as catalysts but still retain sufficient activity to promote the desired hydrocarbon conversion. The exact composition of these "red oil" complexes is not known, but they apparently are the result of the interaction of aluminum halide and hydrocarbons, and generally speaking, contain from about 10 to about 65% hydrocarbons attached to the aluminum halide.

Many methods have been suggested for the recovery of the aluminum halide from an aluminum halide sludge. Suggested methods include distillation, coking, destructive hydrogenation of the hydrocarbon complex to yield aluminum halides and hydrocarbons, decomposition of the aluminum halide to aluminum oxide and halogen, etc. All such methods are directed to the recovery of the aluminum halide, free of the hydrocarbons with which it has formed a complex material.

Figure 2:
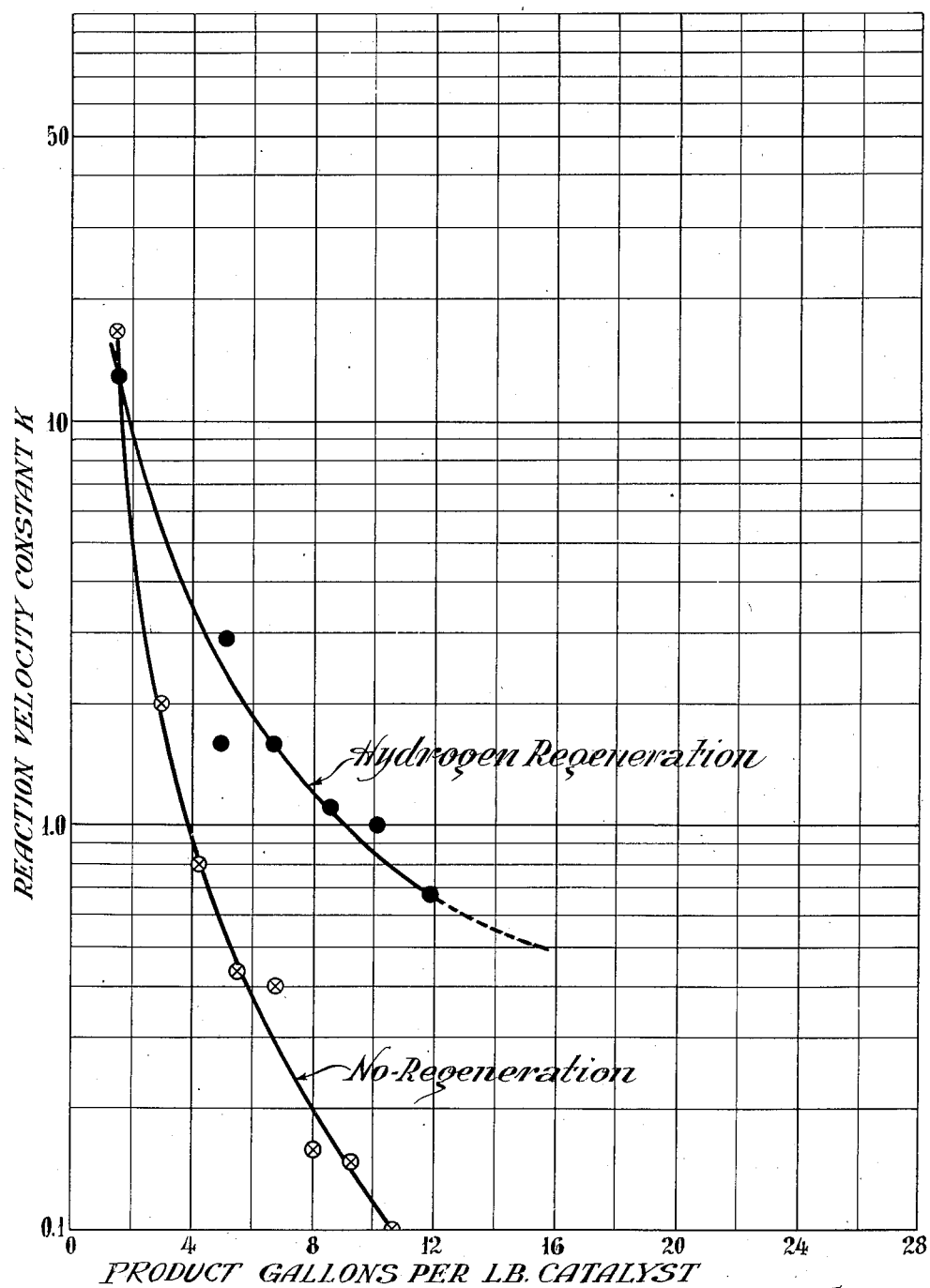

It is an object of our invention to provide a process for the reactivation of aluminum halide sludge. Another object of our invention is to provide a process for the restoration of catalytic activity to an aluminum halide catalyst spent as regards hydrocarbon conversion. A further object of this invention is to provide a process for the recovery of active catalytic material from an aluminum halide sludge. An additional object of our invention is to provide a process for regenerating a spent aluminum halide catalyst for further use in the conversion of hydrocarbon material. Additional objects and advantages will become apparent as the description of our invention proceeds, read in conjunction with the accompanying drawings which form a part of this specification, and in which Figure 1 represents a simplified flow diagram of a process embodying one example of our invention and Figure 2 is a graph comparing an isomerization reaction with and without hydrogen regeneration of the catalyst.

Briefly stated, we have found that the catalytic activity of an aluminum halide sludge can be substantially restored by contacting it with hydrogen, either alone or in the presence of a hydrogen halide, under temperature and pressure conditions which promote the reactivation. It should be stated emphatically that our process does not contemplate the recovery of aluminum halide as such, substantially or entirely free of hydrocarbon material, but is directed to restoring activity to the catalyst in the form of a mobile fluid aluminum halide-hydrocarbon complex.

Although our process is applicable to the restoration of a spent aluminum halide catalyst from any hydrocarbon conversion process such as alkylation, polymerization, etc., it will be described by way of example in relation to a paraffin isomerization process employing aluminum chloride as the catalyst.

Referring now to the drawings: A feed stock from line 11 enters isomerization reactor 10 through line 12. As feed stock we can employ a virgin stock boiling within the range of from about 0 to 550° F., suitably from about 30 to about 400° F., and preferably from about 100 to about 155° F., from any suitable source such as straight-run napthas from crudes, natural gasolines from natural gas or "distillate" wells, etc. Although aromatic and olefinic hydrocarbons may be present, it is desirable to carry out our process with a substantially saturated feed stock, free of aromatics and olefins.

Catalyst enters through line 13 which joins line 12. As a catalyst we can employ fresh anhydrous aluminum chloride or can employ an active catalyst formed by the reaction between aluminum chloride and a hydrocarbon or hydrocarbon mixture, preferably one predominantly paraffinic and/or naphthenic in nature. It is quite feasible for our process to inaugurate the reaction using fresh aluminum chloride and then as the reaction proceeds to replace the fresh aluminum chloride with recycled sludge or reactivated sludge, or a combination of any two or three of these catalysts. The isomerization reaction is preferably carried out in the presence of a promoter, such as hydrogen chloride or an organic compound yielding hydrogen chloride under the reaction conditions, which enters through line 14. The catalyst can be present within the range of from about 5 to 65% by weight of the incoming feed stock, preferably from about 10% to about 50% by weight, while the hydrogen chloride promoter is present to the extent of about 0.1 to about 10% by weight of the charge, preferably about 1 to 3%. The reaction is carried out at a temperature of from about 200 to 500° F., preferably about 250° to 350° F., and at atmospheric or superatmospheric pressures, for example, from about 0 to about 500 pounds per square inch gauge pressure, or at least under such conditions that the reactants are in the liquid phase. As illustrated, the reaction can be carried out in coils 15 in reactor 10. The catalyst, feed stock and promoter are intimately mixed as they pass through line 12 to coils 15, and the turbulent flow through the coils insures continued intimate contact of the reactants. Mixing means (not shown) can be inserted in line 12, or any other suitable means for obtaining intimate contact between two immiscible or slightly miscible fluids can be employed. For example, mechanical stirrers can be substituted, or the reactor can be fitted with a system of baffle plates. Turbo mixers, jet injectors, etc. can also be used. The time of contact can range from five minutes to two hours, preferably about one hour, and will depend upon the temperature at which the reaction is carried out and the catalyst concentration.

The reaction chamber can be maintained at the proper temperature by employing a suitable temperature-control medium, etc., which flows through reactor 10, entering through line 16 and discharging through line 17. It is also possible and usually desirable to heat the incoming feed stock (by means not shown) to the desired temperature or thereabouts and also to elevate the temperature of the catalyst within the approximate range desired to initiate the reaction.

The hydrocarbons together with the catalyst and promoter are withdrawn from reactor 10 by line 18 and directed to settler 19, wherein a separation between the hydrocarbons and the catalyst takes place, the catalyst settling to the bottom of the settler 19. The hydrocarbons are withdrawn overhead through line 20 and can be directed to fractionator 21 wherein the hydrogen chloride and any normally gaseous hydrocarbons which may have been formed during the reaction are taken overhead through line 22 and may be discarded by opening valve 23 in line 24 or recycled to the isomerization reactor 10 by opening valve 25 in line 26 which joins line 14. This will be particularly desirable in case there are major quantities of hydrogen chloride remaining from the reaction. The products from the isomerization reaction of any desired boiling range, preferably of a boiling range suitable for use as a motor fuel or an aviation gasoline, is withdrawn through line 27 while heavier hydrocarbons can be withdrawn through line 28.

The separated aluminum chloride-hydrocarbon sludge is withdrawn from settler 19 through line 29. In case it still retains a sufficient amount of activity it can be recycled directly to isomerizer 10 by opening valve 30 in line 31 which joins line 13 leading to reactor 10. If, however, it has become spent as regards the promotion of isomerization it can be withdrawn by opening valve 32 in line 33 and sent to reactivator 34. Alternately it is quite possible to recycle a part of the catalyst sludge from settler 19 and to reactivate the remainder by the proper adjustment of valves 30 and 32 in lines 31 and 33 respectively. Preferably, the catalyst is withdrawn for regeneration while still mobile and fluid, not only because of greater ease in handling, but also because it can be regenerated more rapidly and easily.

The aluminum chloride sludge is intimately contacted in reactivator 34 with hydrogen which enters through line 35. The reactivation can be carried out at temperatures within the range of from about 200 to about 500° F. and under a pressure of from about 40 to about 400 atmospheres of hydrogen. In all events, however, the conditions of temperature and pressure are so selected as to preclude the distillation or sublimation of the aluminum chloride from the sludge, or the coking or destructive hydrogenation of the hydrocarbon material in the sludge with the liberation of aluminum chloride therefrom. If desired, a small amount of a hydrogen halide, such as hydrogen chloride, can be used, which enters through line 36. The hydrogen, hydrogen chloride and the catalyst sludge are intimately contacted in reactivator 34 by any suitable means, such as a stirrer 37, for a period of time which may range from 0.5 hour to 10 hours, preferably 3 hours, depending upon the type of sludge encountered, and the reactivated sludge together with unreacted hydrogen withdrawn through line 38 which leads to separator 39. In separator 39 the hydrogen can be released overhead through line 40 and discarded by opening valve 41 in line 42, but preferably is recycled to reactivator 34 by opening valve 43 in line 44 which joins line 35. During the course of the reactivation a certain amount of hydrocarbon material will be freed from the sludge and this can be withdrawn through line 45. Generally speaking, less than 4% hydrogen, based on the weight of catalyst, will be consumed.

The reactivated sludge, now substantially restored in activity, is withdrawn from separator 39 through line 46 and can be sent to storage by opening valve 47 in line 48, but preferably is returned to the isomerization reactor by opening valve 49 in line 50 which joins line 13 leading to reactor 10.

As an example of our process, we have isomerized a light naphtha with an aluminum chloride-hydrocarbon complex formed during the reaction with and without hydrogen regeneration of the catalyst. The results are set forth in Tables I and II, Table I being data obtained without regeneration between runs and Table II containing data obtained when using hydrogen regeneration. A comparison is also shown graphically in Figure II in which the reaction velocity constant $k$ is plotted against gallons of product obtained per pound of catalyst. Perhaps the most striking measure of catalyst activity in isomerization is the increase in octane number of the product. However, the octane number is not only a function of the catalyst activity but also of the contact time, which must be corrected, since the time is varied appreciably in the early stages in order to avoid overtreating the feed stock. This correction can be made and the catalyst activity readily evaluated in terms of the specific reaction velocity constant by calculating $k$ assuming the unimolecular reaction law which has been shown experimentally to be followed. In order to use the unimolecular equation it is necessary to have a measure of the percent isomerization. This is not readily determined but it is possible to use the octane number increase as an index of the conversion to branched-chain hydrocarbon. Thus the $k$ values used in these tables and Figure 2 were calculated from the following equation:

$$k = \frac{2.3}{t} \log \frac{Z}{Z - \Delta CFR\text{-}M}$$

where $t$ = time in hours $Z$ = equilibrium octane number minus octane number of feed.

$\Delta CFR\text{-}M$ = octane number of product minus octane number of naphtha. The "equilibrium octane number" is the highest constant octane number obtainable on any given feed stock at a specific temperature and is not affected by increased time of contact or increased ratio of amount of catalyst to amount of oil. The catalyst activity is usually such that the octane number of the product is not as great as the equilibrium octane number so that $\Delta CFR\text{-}M$ is less than $Z$.

The constants thus calculated are only relative but are preferably valid for comparison purposes.

*Table I*

| | Run | | | | | | | | Summary |
|---|---|---|---|---|---|---|---|---|---|
| | A | B | C | D | E | F | G | H | |
| Charge: | | | | | | | | | |
| Light naphtha, liters | 1.0 | 0.78 | 0.78 | 0.78 | 0.78 | 0.78 | 0.78 | 0.78 | 6.32 |
| Catalyst, wt. % of feed | | | | | 10.8 | | | | [1] 1.69 |
| Activator, wt. % of feed | 3.0 | 2.7 | 2.7 | 2.7 | 2.7 | 2.7 | 2.7 | 2.7 | 2.7 |
| Gals. L. N. processed/lb. catalyst | 1.7 | 3.0 | 4.3 | 5.6 | 6.9 | 8.2 | 9.5 | 10.8 | 10.8 |
| Conditions: | | | | | | | | | |
| Temperature, °F | 300 | 300 | 316 | 330 | 332 | 332 | 330 | 332 | 330 |
| Contact time, hrs | 0.13 | 0.15 | 0.33 | 1.33 | 2.50 | 2.75 | 3.75 | 4.42 | [2] 1.92 |
| Results: | | | | | | | | | |
| Vol. % yield (output basis, C₄-free) | | | | | | | | | 94.2 |
| Octane number—CFR-M (C₄-free) | 80.5 | 73.2 | 71.9 | 74.5 | 77.2 | 73.9 | 74.5 | 73.4 | 74.9 |
| A. P. I. gravity | 84.9 | 83.6 | 83.3 | 84.1 | 84.3 | 83.8 | 84.1 | 84.1 | 84.0 |
| R. V. P., lbs./sq. in | | | | | | | | | 12.0 |
| Isobutane, g | 35.7 | 11.3 | 8.2 | 17.0 | 27.4 | 19.6 | 18.7 | 15.0 | [3] 3.7 |
| Wt. % red oil (based on feed) | | | | | | | | | 2.4 |
| Reaction velocity constant $k$ | 17.0 | 2.0 | 0.8 | 0.45 | 0.40 | 0.16 | 0.15 | 0.09 | |
| Weight balance, percent | | | | | | | | | 98.3 |

[1] Actual catalyst concentration during each batch run, 10.8%.
[2] Average.
[3] Wt. % weight based on feed.

*Table II*

| | Run | | | | | | | | | | | | | | | | | | Summary |
|---|---|---|---|---|---|---|---|---|---|---|---|---|---|---|---|---|---|---|---|
| | A | A-R-B | B | B-R-C | C | C-R-D | D | D-R-E | E | E-R-F | F | F-R-G | G | G-R-H | H | H-R-J | J | | |
| Charge: | | | | | | | | | | | | | | | | | | | |
| Light naphtha, liters | 1.0 | | 1.0 | | 1.0 | | 1.0 | | 1.0 | | 1.0 | | 1.0 | | 1.0 | | 1.0 | | 9.0 |
| Catalyst, wt., % of feed | | | | | | | | | | 10.8 | | | | | | | | | [1] 1.2 |
| Activator, wt. % of feed, g | 3.1 | (5.0) | 3.1 | (5.0) | 3.0 | (5.7) | 3.1 | (6.0) | 3.1 | (6.0) | 2.9 | (6.0) | 3.0 | (6.8) | 3.1 | (6.0) | 3.1 | | 3.1 |
| Gals. L. N. processed/lb. catalyst | 1.7 | | 3.4 | | 5.1 | | 6.8 | | 8.5 | | 10.2 | | 11.9 | | 13.6 | | 15.3 | | 15.3 |
| Conditions: | | | | | | | | | | | | | | | | | | | |
| Init. H₂ press., lbs./sq. in | | 1,000 | | 1,000 | | 1,000 | | 1,000 | | 1,000 | | 1,000 | | 1,000 | | 1,000 | | | |
| Temperature, °F | 310 | 318 | 312 | 320 | 330 | 325 | 329 | 324 | 330 | 323 | 324 | 321 | 377 | 320 | 328 | 324 | 325 | | 325 |
| Contact time, hrs | 0.13 | 3.0 | 0.27 | 3.0 | 1.0 | 3.0 | 1.0 | 3.0 | 1.0 | 3.0 | 1.0 | 3.0 | 1.0 | 6.0 | 1.0 | 6.0 | 1.0 | | |

| | Run | | | | | | | | | | | | | | | | | | Summary |
|---|---|---|---|---|---|---|---|---|---|---|---|---|---|---|---|---|---|---|---|
| | A | A-R-B | B | B-R-C | C | C-R-D | D | D-R-E | E | E-R-F | F | F-R-G | G | G-R-H | H | H-R-J | J | | |
| Results: | | | | | | | | | | | | | | | | | | | |
| Vol. % yield (output basis C₄ free) | | | | | | | | | | | | | | | | | | | 96.8 |
| Octane number—CFR-M (C₄-free) | 79.5 | | 76.5 | | 79.1 | | 79.2 | | 77.2 | | 76.7 | | 74.6 | | 75.1 | | 74.4 | | 77.0 |
| °A. P. I. gravity | 84.1 | | 83.0 | | 83.5 | | 83.2 | | 83.8 | | 83.4 | | 83.2 | | 83.2 | | 83.2 | | 83.5 |
| R. V. P., lbs./sq. in | | | | | | | | | | | | | | | | | | | 12.3 |
| Isobutane, g | 24.4 | | 14.1 | | 26.7 | | 18.6 | | 17.1 | | 9.3 | | 11.6 | | 17.5 | | 15.7 | | ²3.4 |
| Wt. % red oil (based on feed) | | | | | | | | | | | | | | | | | | | 0.4 |
| Hydrocarbon removed from cat., g | | 20.0 | | 9.9 | | 15.1 | | 5.3 | | 8.1 | | 4.2 | | 8.1 | | 7.5 | | | |
| H₂ consumption, cu. ft | | 2.3 | | 0.69 | | 0.90 | | 1.08 | | 1.34 | | 1.24 | | 1.43 | | 1.21 | | | |
| Reaction velocity constant k | 13.1 | | 8.6 | | 1.6 | | 1.6 | | 1.1 | | 1.0 | | 0.68 | | 0.74 | | 0.65 | | |
| Weight balance, % | | | | | | | | | | | | | | | | | | | 96. |

¹ Actual catalyst concentration during each batch run of the life study, 10.8%.
² Wt. % based on feed.

The isomerization reactions in both Table I and Table II were carried out on a light naphtha having an initial of about 110° F. and an end point of about 153° F. which was substantially saturated, at comparable temperatures, between 300 and 335° F. using hydrogen chloride as the activator. Fresh aluminum chloride was used in runs A in Table I and A in Table II the complex from each run being used in each succeeding run throughout the tests. The regeneration in Table II is indicated by the heading, e. g., A—R—B, indicating that regeneration took place between run A and run B.

It will be obvious from the above that the catalyst life was considerably prolonged by the use of hydrogen regeneration between runs. It was thought necessary in Table I to discontinue after run H because the catalyst was sufficiently spent to preclude any further effective treatment. This yielded only 10.8 gallons of product per pound of catalyst. It was necessary in Table I to increase the contact time continuously in order to obtain a product having an octane number comparable to the octane number of the preceding runs, which was not true in Table II. The reaction velocity constant of Table II was consistently higher throughout than in Table I. Moreover, the catalyst at the end of the runs in Table II was still capable of being regenerated for further catalytic activity with low contact times, in addition to the fact that the volume of products produced was markedly higher than when no regeneration was employed. We have thus shown that by reconverting a spent or partially spent aluminum halide-catalyst to the form of a mobile hydrocarbon complex, we can reuse it catalytically for repeated conversions, thereby increasing the yield per unit of catalyst extensively. We can also employ shorter contact times, thereby decreasing the time required for the production of a given amount of product.

Although we have illustrated our process in reference to an isomerization reaction, it should be understood to be equally applicable to other hydrocarbon conversion processes, such as polymerization, condensation, alkylation, etc., which involve the use of an aluminum halide, (particularly the chloride or bromide) as catalysts and during which the catalyst is deteriorated or spent by the formation of an aluminum halide-hydrocarbon sludge.

Our process is particularly applicable to the regeneration of aluminum halide-hydrocarbon sludges from hydrocarbon conversions carried out at relatively low temperatures as, for example, temperatures less than 550° F., and preferably at temperatures less than 350° F. Generally speaking, sludges formed at these temperatures do not exhibit coky or brittle characteristics and are much more easily regenerated. It becomes highly advantageous to regenerate rather than recycle at some minimum catalyst activity, which can be determined for each particular hydrocarbon conversion process. For example, in isomerization of the type described herein, it is desirable to regenerate before the reaction velocity constant $k$ falls below 0.5 and preferably before it falls below 1.0. Similar minimum constants can be determined for alkylation and polymerization reactions. To do this it is usually desirable to use a portion of the spent catalyst from the polymerization or alkylation reaction to isomerize a hydrocarbon mixture of known equilibrium octane number and from the increase in octane number thus occasioned by the spent catalyst determine the reaction velocity constant $k$ for the spent polymerization or alkylation catalyst.

For the sake of simplicity and clarity we have omitted various details as regards pumps, heat exchangers, valves, automatic control means, etc., the use of which will be readily understood by one skilled in the art. We have also illustrated our process as having one reactor and one regenerator, but it is fully contemplated that multiple reactors and regenerators will be used, either in series or in parallel.

It is also equally suitable to carry out our process batchwise in a single reactor, the flow of fresh feed and recycle stock being shut off, the hydrocarbon material separated from the catalyst, and the catalyst subjected to hydrogen in the presence, if desired, of hydrogen chloride, under the above-named conditions of time, temperature and pressure. By this method of operation, the need for a separate regenerator is eliminated. Since the specific embodiment of our process is by way of illustration and not by way of limitation, we do not intend to be strictly limited thereto, but only by the scope of the appended claims.

We claim:

1. A process for the recovery of active catalytic material from an aluminum halide-hydrocarbon sludge formed during the conversion of hydrocarbons in the presence of an aluminum halide catalyst which comprises regenerating said aluminum halide-hydrocarbon sludge with hydrogen in the presence of a hydrogen halide and in the substantial absence of other regenerating agent under conditions of elevated temperature and elevated pressure adapted to promote the restoration of said aluminum halide sludge to an active mobile liquid aluminum halide-hydrocarbon complex catalyst.

2. A process for the recovery of active catalytic material from an aluminum halide-hydrocarbon sludge formed during the conversion of hydrocarbons in the presence of an aluminum halide catalyst which comprises regenerating said aluminum halide-hydrocarbon sludge with hydrogen in the presence of a hydrogen halide and in the substantial absence of other regenerating agent under a pressure with the range of from 40 to 400 atmospheres and at an elevated temperature adapted to promote the restoration of said aluminum halide sludge to an active mobile liquid aluminum halide-hydrocarbon complex catalyst.

3. A process for the recovery of active catalytic material from an aluminum halide-hydrocarbon sludge formed during the conversion of hydrocarbons in the presence of an aluminum halide catalyst which comprises regenerating said aluminum halide-hydrocarbon sludge with hydrogen in the presence of a hydrogen halide and in the substantial absence of other regenerating agent at a temperature with the range of from 200 to 500° F. and under a hydrogen pressure of from 40 to 400 atmospheres.

4. A process according to claim 1 in which the aluminum halide comprises aluminum chloride.

5. In a process for the conversion of hydrocarbons employing an aluminum halide catalyst in the absence of added hydrogen, the improvement comprising withdrawing the spent aluminum halide catalyst from the conversion step, regenerating said spent catalyst with hydrogen in the presence of a hydrogen halide and in the substantial absence of other regenerating agent under conditions of elevated temperature and elevated pressure whereby the activity of said spent catalyst is substantially restored without formation of free aluminum halide, and returning said restored catalyst to said conversion step.

6. In a process for the conversion of hydrocarbons of gasoline boiling range to hydrocarbons of improved octane number which comprises contacting said hydrocarbons of gasoline boiling range with a catalyst comprising a fluid aluminum halide-hydrocarbon complex in the absence of added hydrogen and in the presence of a promoter comprising a hydrogen halide under conditions of temperature, pressure and time of contact adapted to promote the isomerization of at least a substantial portion of said hydrocarbons of gasoline boiling range to hydrocarbons of increased octane number, whereby said catalyst is converted to an aluminum chloride-hydrocarbon complex of decreased catalytic activity, the improvement comprising separating said hydrocarbons of increased octane number from the spent catalyst, regenerating said spent catalyst with hydrogen in the substantial absence of other regenerating agent under conditions of temperature, pressure and time of contact and in the presence of hydrogen chloride whereby the activity of said spent catalyst is substantially restored and contacting said restored catalyst with further amounts of said hydrocarbons of gasoline boiling range for the production of further quantities of hydrocarbons of improved octane number.

7. A process for the restoration of catalytic activity to an aluminum halide-hydrocarbon complex spent as regards the promotion of the catalytic conversion of hydrocarbons which comprises regenerating said spent complex with hydrogen in the presence of a hydrogen halide and in the substantial absence of other regenerating agent under a pressure of from about 40 to 400 atmospheres and at elevated temperatures sufficient to effect the restoration but insufficient to recover aluminum halide from the complex.

8. In a process for the conversion of hydrocarbons in the presence of a catalyst comprising the reaction product of a substantially saturated hydrocarbon and aluminum chloride wherein said catalyst is reduced in activity and converted to a sludge, the improvement comprising regenerating said catalyst sludge substantially free of reacting hydrocarbons with hydrogen in the presence of hydrogen chloride and in the substantial absence of other regenerating agent at an initial pressure of about 1000 pounds per square inch at a temperature within the range of from 318 to 325° F. for a period of about three hours whereby the activity of the catalyst for promoting said conversion is substantially restored and using said restored catalyst for the conversion of further quantities of hydrocarbons.

BERNARD L. EVERING.
EDMOND L. D'OUVILLE.

CERTIFICATE OF CORRECTION.

Patent No. 2,293,891.                                                August 25, 1942.

BERNARD L. EVERING, ET AL.

It is hereby certified that error appears in the printed specification of the above numbered patent requiring correction as follows: Page 3, Table II, under "Run G", line 2 from bottom of page, for "377" read --327--; page 4, same Table II continued, under "Summary", last line thereof, for "96." read --96.2--; page 5, first column, lines 23 and 36, claims 2 and 3 respectively, for "with" read --within--; and that the said Letters Patent should be read with this correction therein that the same may conform to the record of the case in the Patent Office.

Signed and sealed this 29th day of September, A. D. 1942.

(Seal)

Henry Van Arsdale,
Acting Commissioner of Patents.